United States Patent
Lipczynski et al.

(10) Patent No.: US 7,914,242 B2
(45) Date of Patent: Mar. 29, 2011

(54) ALIGNING A MACHINE TOOL WITH A TARGET LOCATION ON A STRUCTURE

(75) Inventors: Gary A. Lipczynski, Riverside, CA (US); Eric Whinnem, Whittier, CA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 12/549,020

(22) Filed: Aug. 27, 2009

(65) Prior Publication Data

US 2010/0047029 A1    Feb. 25, 2010

Related U.S. Application Data

(62) Division of application No. 11/832,269, filed on Aug. 1, 2007, now Pat. No. 7,611,314.

(51) Int. Cl.
B23B 47/28 (2006.01)

(52) U.S. Cl. .................................. 408/97; 408/115 R

(58) Field of Classification Search ............. 408/72 R, 408/72 B, 95, 97, 115 R, 115 B
See application file for complete search history.

(56) References Cited

U.S. PATENT DOCUMENTS

| | | | |
|---|---|---|---|
| 2,839,953 A * | 6/1958 | Hanger ................... 408/72 R |
| 4,269,550 A * | 5/1981 | DiGiulio ................. 408/241 B |
| 4,971,340 A | 11/1990 | Rall | |
| 5,054,968 A * | 10/1991 | Eckman ....................... 408/97 |
| 5,161,923 A * | 11/1992 | Reccius ................... 408/72 R |
| 5,275,424 A | 1/1994 | Watanabe | |
| 5,372,464 A * | 12/1994 | Bureller .................... 408/72 B |
| 5,482,411 A * | 1/1996 | McGlasson ................. 408/1 R |
| 6,467,385 B1 | 10/2002 | Buttrick et al. | |
| 6,514,018 B2 | 2/2003 | Martinez et al. | |
| 6,533,292 B2 | 3/2003 | Fant | |
| 6,533,508 B1 | 3/2003 | Nonaka | |
| 6,719,505 B2 | 4/2004 | Linderholm et al. | |
| 6,722,447 B2 | 4/2004 | Stepan et al. | |
| 6,832,433 B2 | 12/2004 | Kramer | |
| 6,843,328 B2 | 1/2005 | Boyl-Davis et al. | |
| 6,872,036 B2 * | 3/2005 | Linderholm .............. 409/200 |
| 6,905,291 B2 | 6/2005 | Day et al. | |
| 6,926,094 B2 | 8/2005 | Arntson et al. | |
| 6,927,560 B2 | 8/2005 | Pedigo et al. | |
| 6,971,824 B2 * | 12/2005 | Blankenship et al. ......... 408/97 |
| 7,134,649 B2 | 11/2006 | Boyl-Davis et al. | |
| 7,137,760 B2 | 11/2006 | Boyl-Davis et al. | |
| 7,162,789 B2 | 1/2007 | Day et al. | |
| 7,163,286 B2 | 1/2007 | Shiraiwa et al. | |
| 7,165,630 B2 | 1/2007 | Arnston et al. | |

(Continued)

FOREIGN PATENT DOCUMENTS

DE    4431952 A1 *    3/1996

(Continued)

*Primary Examiner* — Daniel W Howell
(74) *Attorney, Agent, or Firm* — Yee & Associates, P.C.; Brett L. Halperin

(57) ABSTRACT

An apparatus for aligning a machine tool with a target location on a structure. A machine plate positionable on the structure has a plate bushing providing a hole through the plate. The apparatus also includes a nosepiece for guiding a distal end of the tool through the plate bushing to the target location. The nosepiece has a collet configured to be moved at least partly through and sideward in the plate bushing to center the nosepiece on an element projecting from the structure at the target location. The nosepiece can be attached to the plate bushing to establish normality of the tool relative to the projecting element.

20 Claims, 12 Drawing Sheets

U.S. PATENT DOCUMENTS

| | | |
|---|---|---|
| 7,216,408 B2 | 5/2007 | Boyl-Davis et al. |
| 7,264,426 B2 | 9/2007 | Buttrick, Jr. et al. |
| 7,269,894 B2 | 9/2007 | Day et al. |
| 7,364,388 B2 * | 4/2008 | Faul et al. ............ 408/115 R |
| 7,380,776 B2 | 6/2008 | Boyl-Davis et al. |
| 7,406,758 B2 | 8/2008 | Jones et al. |
| 7,469,907 B2 | 12/2008 | Laube et al. |
| 7,484,288 B2 | 2/2009 | Day et al. |
| 7,488,144 B2 | 2/2009 | Boyl-Davis et al. |
| 7,498,796 B2 | 3/2009 | Georgeson et al. |
| 2005/0052898 A1 | 3/2005 | Arntson |
| 2007/0114989 A1 | 5/2007 | Arntson |
| 2008/0015158 A1 | 1/2008 | Ichiro et al. |

FOREIGN PATENT DOCUMENTS

| | | |
|---|---|---|
| DE | 202007002845 | 6/2007 |
| EP | 0761351 A1 | 3/1997 |
| FR | 2562179 A1 * | 10/1985 |
| FR | 2703280 A1 * | 10/1994 |
| SU | 1321532 A1 * | 7/1987 |
| WO | 02102535 A1 | 12/2002 |
| WO | 2006088404 A1 | 8/2006 |

* cited by examiner

ALIGNING A MACHINE TOOL WITH A TARGET LOCATION ON A STRUCTURE

This application is a divisional of application Ser. No. 11/832,269, filed Aug. 1, 2007, status allowed.

FIELD

The present disclosure relates generally to machine tooling for the construction and assembly of structures and more particularly (but not exclusively) to aligning a machine tool such as a drill or cutting tool with a target location in a structure.

BACKGROUND

The statements in this section merely provide background information related to the present disclosure and may not constitute prior art.

In the construction of aircraft, two or more parts may be spliced together to form an airframe section. One part typically is overlaid onto another, and holes may be drilled through the aligned parts to accommodate fasteners. Drilling locations in the parts are typically selected in accordance with nominal design specifications. In some splicing applications, drill jigs may be used to guide a drilling tool to the nominal drilling locations.

SUMMARY

The present disclosure, in one configuration, is directed to an apparatus for aligning a machine tool with a target location on a structure. The apparatus includes a machine plate positionable on the structure. The plate has a plate bushing that provides a hole through the machine plate. The apparatus also includes a nosepiece for guiding a distal end of the tool through the plate bushing to the target location. The nosepiece has a collet configured to be moved at least partly through and sideward in the plate bushing to center the nosepiece on an element projecting from the structure at the target location. The nosepiece is configured for attachment to the plate bushing to establish a predefined approach angle of the tool relative to the projecting element.

In another configuration, the disclosure is directed to a machine assembly including a machine tool and an apparatus for aligning a distal end of the machine tool with a target location on a structure. The apparatus includes a machine plate positionable on the structure and having one or more plate bushings each providing a hole through the machine plate. The apparatus also includes a nosepiece for guiding the tool distal end through the plate bushing to the target location when the plate bushing is placed over the target location. The nosepiece has a housing and a collet attached to and extending distally from the housing. The collet has a distal end configured to pass through the plate bushing. The collet is further configured to be moved radially in the plate bushing to center the nosepiece over an element projecting from the structure at the target location. The housing is configured for attachment to the plate bushing to establish normality of the tool relative to the projecting element.

In another implementation, the disclosure is directed to a method of aligning a machine tool with a target location on a structure. A distal end of the machine tool is inserted into a nosepiece for guiding a distal end of the tool. The nosepiece has a housing and a collet attached to and extending distally from the housing. The method includes inserting a distal end of the collet through a plate bushing in a machine plate positioned over an element projecting from the structure at the target location. The collet is moved radially in the plate bushing to center the collet distal end over the element projecting from the structure. The method includes affixing the centered collet distal end to the projecting element, and affixing a distal end of the housing to the plate bushing.

In yet another configuration, the disclosure is directed to a machine plate for use with a machine tool. The machine plate has a body including at least one plate bushing having a hole positionable relative to a target location on a structure. The plate bushing includes a rim graspable by a nosepiece through which the machine tool is operable. The plate bushing is configured to allow passage therethrough of a distal end of a collet attached to the nosepiece. The plate bushing is further configured to allow radial movement of the collet therein for centering of the collet over an element projecting from the structure at the target location. The plate bushing is further configured to establish a predefined angle of approach by the machine tool relative to the projecting element when the nosepiece has grasped the rim of the plate bushing.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

Figure 1:
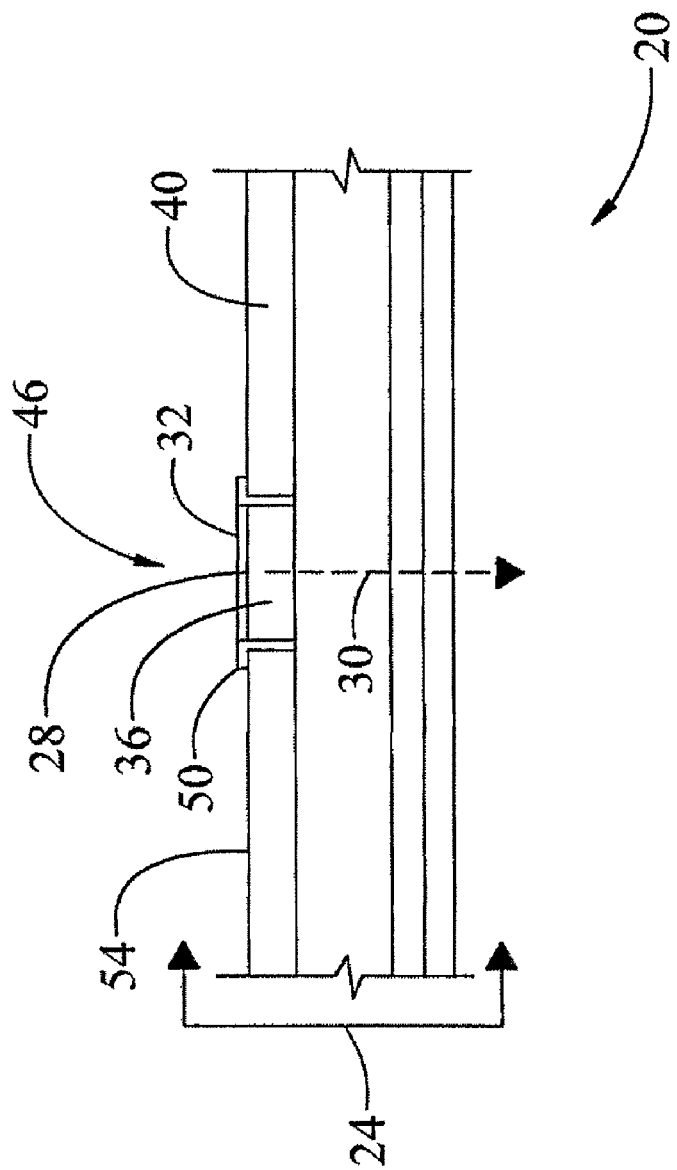
FIG. 1 is a cross sectional view of a structure in relation to which an apparatus for aligning a machine tool may be used in accordance with one implementation of the disclosure.

The following description is merely exemplary in nature and is not intended to limit the present disclosure, application, or uses. It should be understood that throughout the drawings, corresponding reference numerals indicate like or corresponding parts and features.

Figure 10:
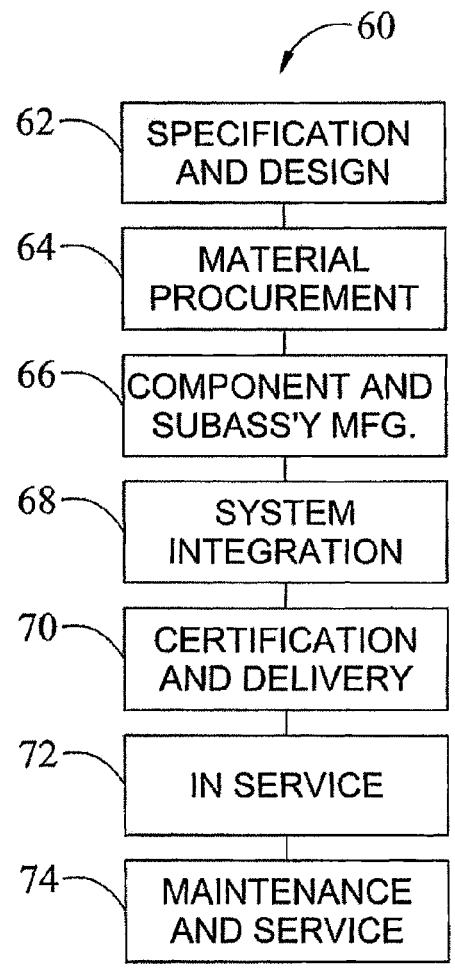
FIG. 10 is a flow diagram of aircraft production and service methodology.
Figure 11:
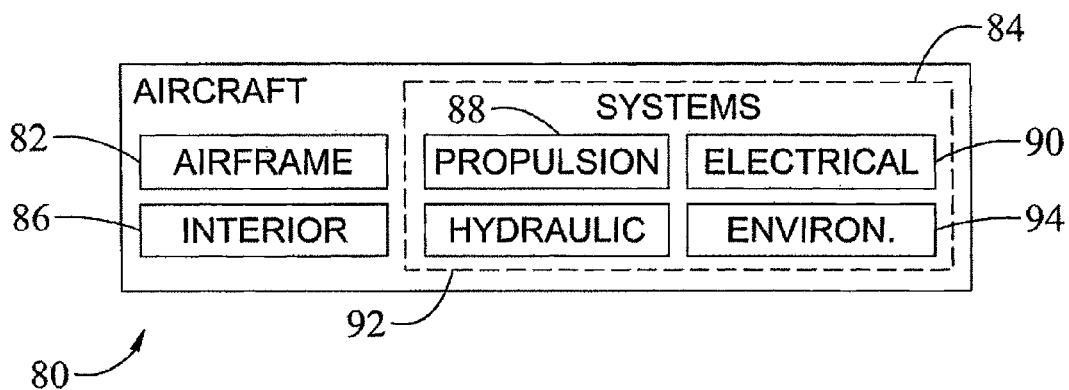
FIG. 11 is a block diagram of an aircraft.

Referring more particularly to the drawings, embodiments of the disclosure may be described in the context of an aircraft manufacturing and service method 60 as shown in FIG. 10 and an aircraft 80 as shown in FIG. 11. During pre-production, exemplary method 60 may include specification and design 62 of the aircraft 80 and material procurement 64. During production, component and subassembly manufacturing 66 and system integration 68 of the aircraft 80 takes place. Thereafter, the aircraft 80 may go through certification and delivery 70 in order to be placed in service 72. While in service by a customer, the aircraft 80 is scheduled for routine maintenance and service 74 (which may also include modification, reconfiguration, refurbishment, and so on).

Each of the processes of method 60 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

As shown in FIG. 11, the aircraft 80 produced by exemplary method 60 may include an airframe 82 with a plurality of systems 84 and an interior 86. Examples of high-level systems 84 include one or more of a propulsion system 88, an electrical system 90, a hydraulic system 92, and an environmental system 94. Any number of other systems may be included. Although an aerospace example is shown, the principles of the invention may be applied to other industries, such as the automotive industry.

Apparatus and methods embodied herein may be employed during any one or more of the stages of the production and service method 60. For example, components or subassemblies corresponding to production process 66 may be fabricated or manufactured in a manner similar to components or subassemblies produced while the aircraft 80 is in service. Also, one or more apparatus embodiments, method embodiments, or a combination thereof may be utilized during the production stages 66 and 68, for example, by substantially expediting assembly of or reducing the cost of an aircraft 80. Similarly, one or more of apparatus embodiments, method embodiments, or a combination thereof may be utilized while the aircraft 80 is in service, for example and without limitation, to maintenance and service 74.

In various implementations, the present disclosure is directed to methods and apparatus for aligning a machine tool with a target location on a structure. The machine tool may be operable, for example, using an orbital drilling unit or other machining module. Various implementations of the disclosure make it possible to perform machining at a target location that could deviate from a nominal machining location.

Figure 12:
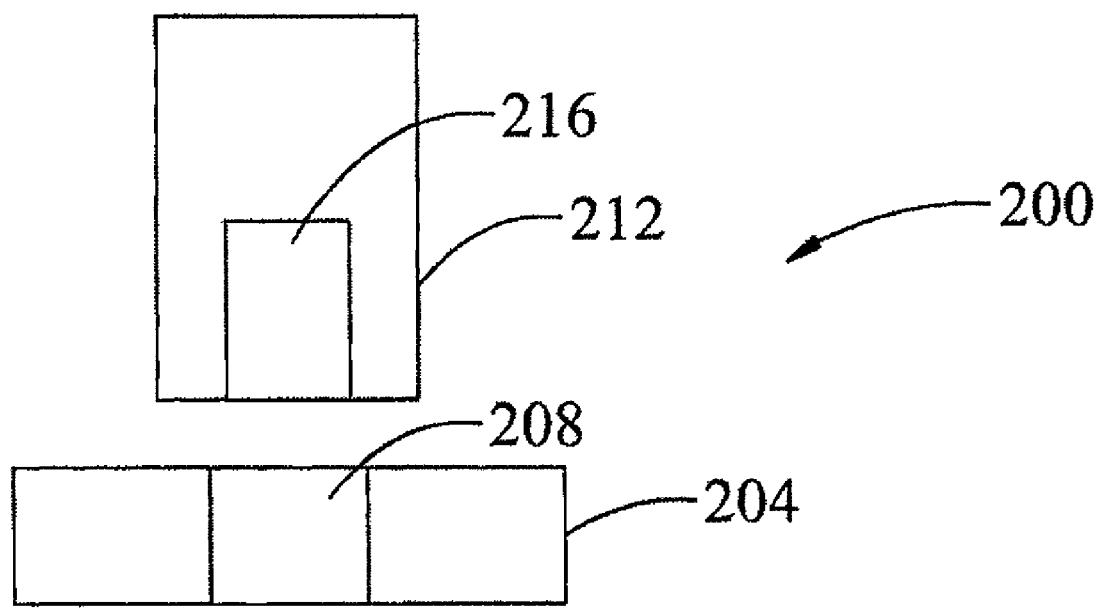
FIG. 12 is a block diagram of an apparatus for aligning a machine tool with a target location on a structure in clamped position in accordance with one implementation of the disclosure.

A block diagram of one configuration of an apparatus for aligning a machine tool with a target location on a structure is indicated generally in FIG. 12 by reference number 200. The apparatus 200 includes a machine plate 204 positionable on the structure. The plate has a plate bushing 208 that provides a hole through the machine plate 204. The apparatus also includes a nosepiece 212 for guiding a distal end of the tool (not shown) through the plate bushing 208 to the target location (not shown). The nosepiece 212 has a collet 216 configured to be moved at least partly through and sideward in the plate bushing 208 to center the nosepiece 212 on an element (not shown) projecting from the structure at the target location. The nosepiece 212 is configured for attachment to the plate bushing 208 to establish a predefined approach angle of the tool relative to the projecting element.

It should be noted that the disclosure could be implemented in connection with many types of machines and/or tools, including but not limited to cutting machines and tools and non-orbital drills. Power feed or positive feed drill motors, plasma cutting torches, water jet nozzles, laser drilling and/or marking equipment, hole saws, broaching heads, and/or various types of machining heads could be adapted for use in accordance with the disclosure. Additionally, although various implementations may be described with reference to splicing applications, the disclosure is not so limited. The disclosure can be implemented in many applications in which it may be desirable to center a machine tool over a machining location and to utilize the tool along a specific vector or approach angle relative to that location.

An exemplary cross section of a structure in which splicing may be performed is indicated generally in FIG. 1 by reference number 20. An orbital drilling unit may be used in accordance with one implementation of the disclosure to drill, e.g., through several aligned parts 24. The parts 24 may be made of different materials, including but not limited to carbon fiber reinforced plastics, metals, etc. In the present example, drilling is to be performed in a plurality of target locations 28, one of which is shown in FIG. 1. Drilling is to be performed along a path 30 through the parts 24, beginning at the target location 28, which is defined by a bushing 32 that lines a hole 36 in an upper splice plate 40. Such a bushing may be referred to in this disclosure and the claims as a "target bushing". Thus drilling may be specified to be performed at a nominal location indicated generally by reference number 46. It should be noted, however, that the nominal drilling location 46 may or may not coincide exactly with the target location 28, dependent, e.g., on tolerances provided in the nominal drilling specification. A flange 50 of the target bushing 32 projects from an upper surface 54 of the structure 20.

Figure 2:
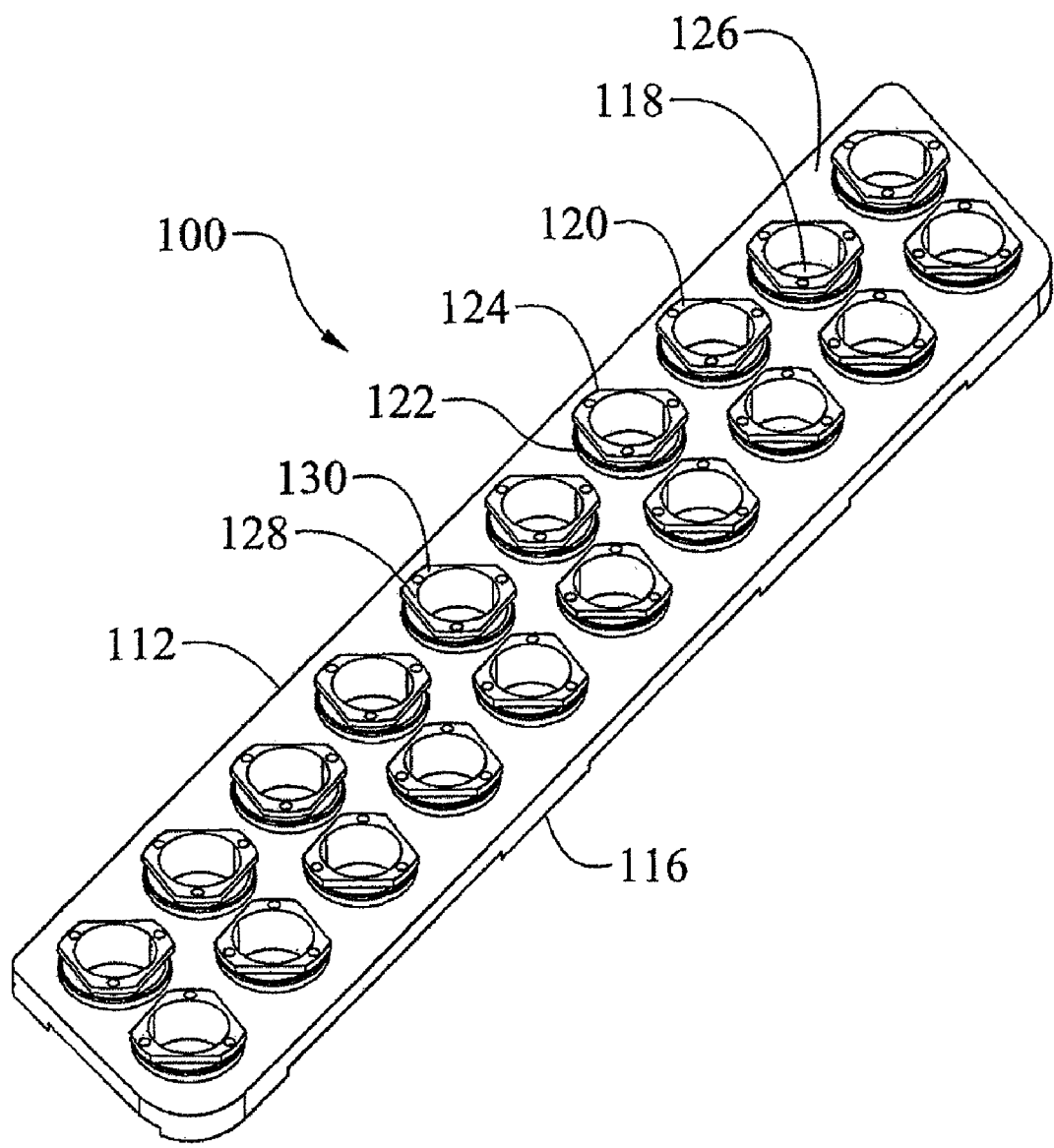
FIG. 2 is a top perspective view of a machine plate in accordance with one implementation of the disclosure.
Figure 3:
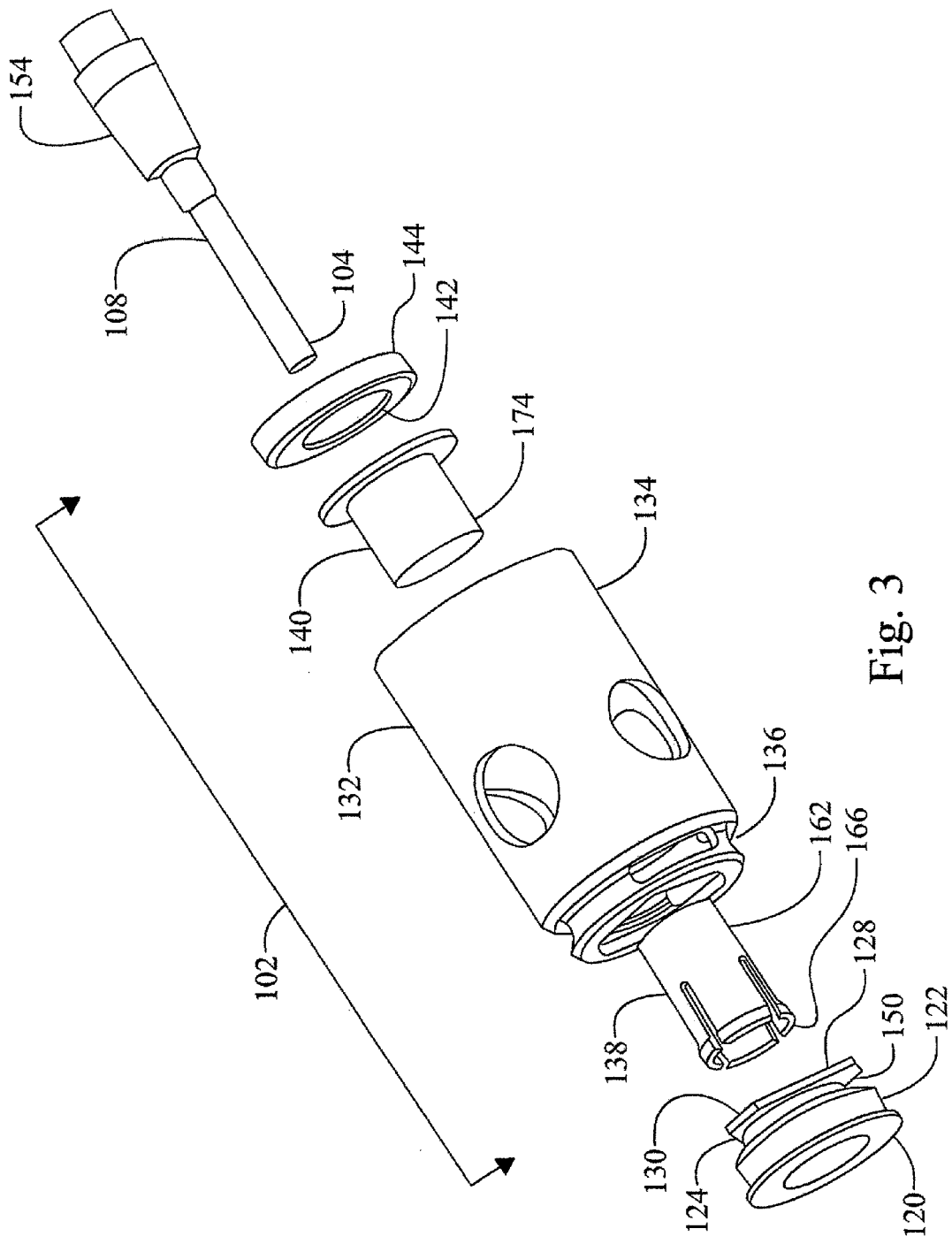
FIG. 3 is an exploded side perspective view of a nosepiece and plate bushing in accordance with one implementation of the disclosure.

Various configurations of an apparatus for aligning a machine tool with a target location on a structure include a machine plate and a nosepiece, e.g., as shown in FIGS. 2 and 3. A target location may be, for example, the target bushing 32 installed in the structure 20, and various aligning apparatus configurations are described below with reference to the structure 20 and target bushing 32. It should be noted, however, that various implementations are contemplated in relation to other types of target locations. For example, the presence of a hole is not necessary at a target location for configurations of the apparatus to align a machine tool. Additionally or alternatively, the disclosure could be implemented in relation to elements other than bushings that project from a structural surface, e.g. nail heads, screw heads, etc. Although such projections could be circular and/or spherical, they could have other or additional shapes.

One configuration of a machine plate is indicated generally in FIG. 2 by reference number 100. One configuration of a nosepiece is indicated generally in FIG. 3 by reference number 102. As further described below, the nosepiece 102 may be used to guide a distal end 104 of a machine tool 108 through the machine plate 100 to a target drilling location 28 on the structure 20. The machine tool 108 is, e.g., a cutting tool operable via an orbital drill unit (not shown in FIG. 3). The terms "proximal" and "distal" are used with reference to a user of the machine tool 108.

Referring now to FIG. 2, the machine plate 100 may be positioned on and attached to the structure surface 54. The machine plate 100 has a body 112 made, for example, of solid aluminum that may be elevated from the surface 54, e.g., by a plurality of supports 116. A plurality of plate bushings 120 are mounted in the machine plate body 112 to provide a plurality of holes 118 through the body 112. Each bushing 120 may be positioned over a corresponding target drilling location on the structure 20. In the present exemplary configuration, the bushings 120 are configured to establish normality of a machine tool relative to a target location as further described below. In some other configurations, however, plate bushings may be configured to establish an approach angle for a machine tool at other than ninety degrees. It should be noted generally that machine plate configurations of various shapes and having various dimensions and numbers of holes, including configurations having a single hole, are contemplated.

In the present configuration, each plate bushing 120 has a distal portion 122 fixedly mounted in the machine plate body 112 and a proximal portion 124 extending above a proximal surface 126 of the machine plate body 112. A plate bushing 120 may be made, e.g., of hardened tool steel and is shown in greater detail in FIGS. 3 and 4. The plate bushing proximal portion 124 has a projecting rim 128 that is graspable by the nosepiece 102 as further described below. In the present configuration, the bushing rim 128 includes a plurality of lobes 130.

Referring now to FIGS. 3, 5, 6 and 7, the nosepiece 102 includes a plurality of substantially concentric components, e.g., a housing 132 having a proximal portion 134 and a distal portion 136, a collet 138, a collet clamp 140, a piston 142 and piston cylinder 144. The housing 132 may be made from one solid piece of steel, e.g., heat treatable stainless or tool steel. The piston 142 and cylinder 144 may be fabricated, e.g., of stainless steel.

Figure 4:
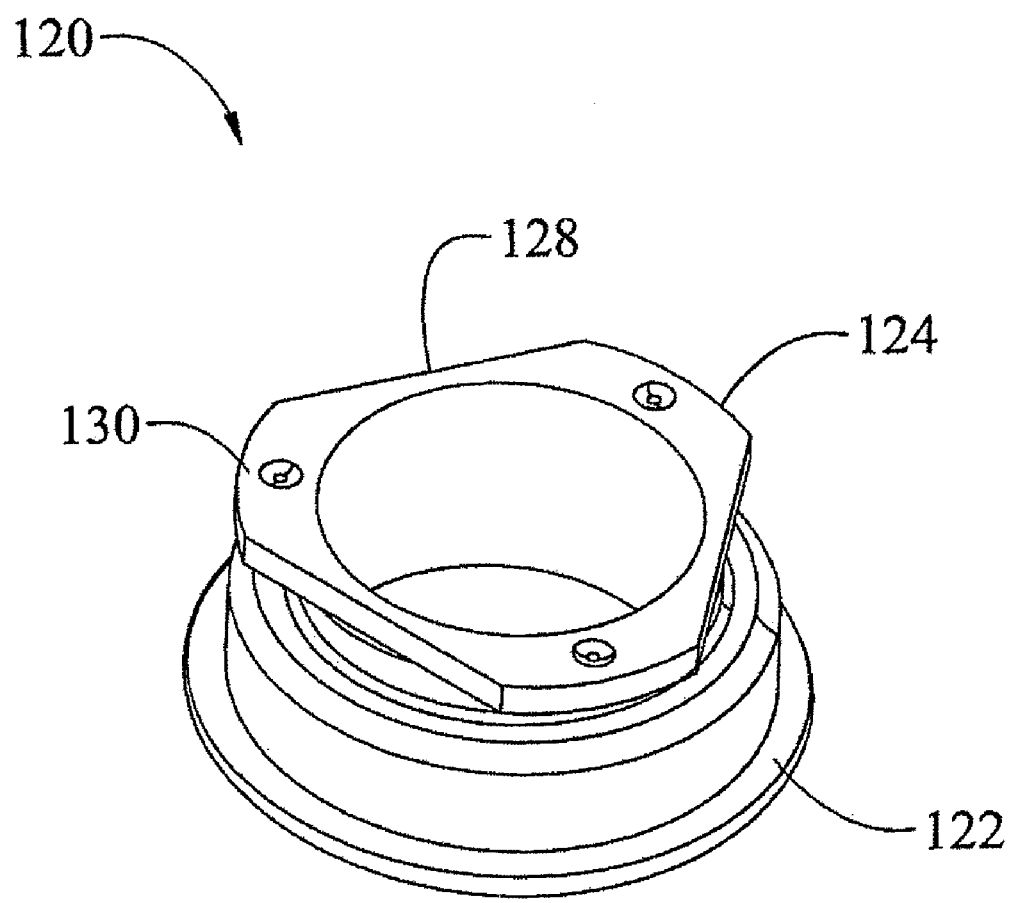
FIG. 4 is a perspective view of a plate bushing in accordance with one implementation of the disclosure.
Figure 5:
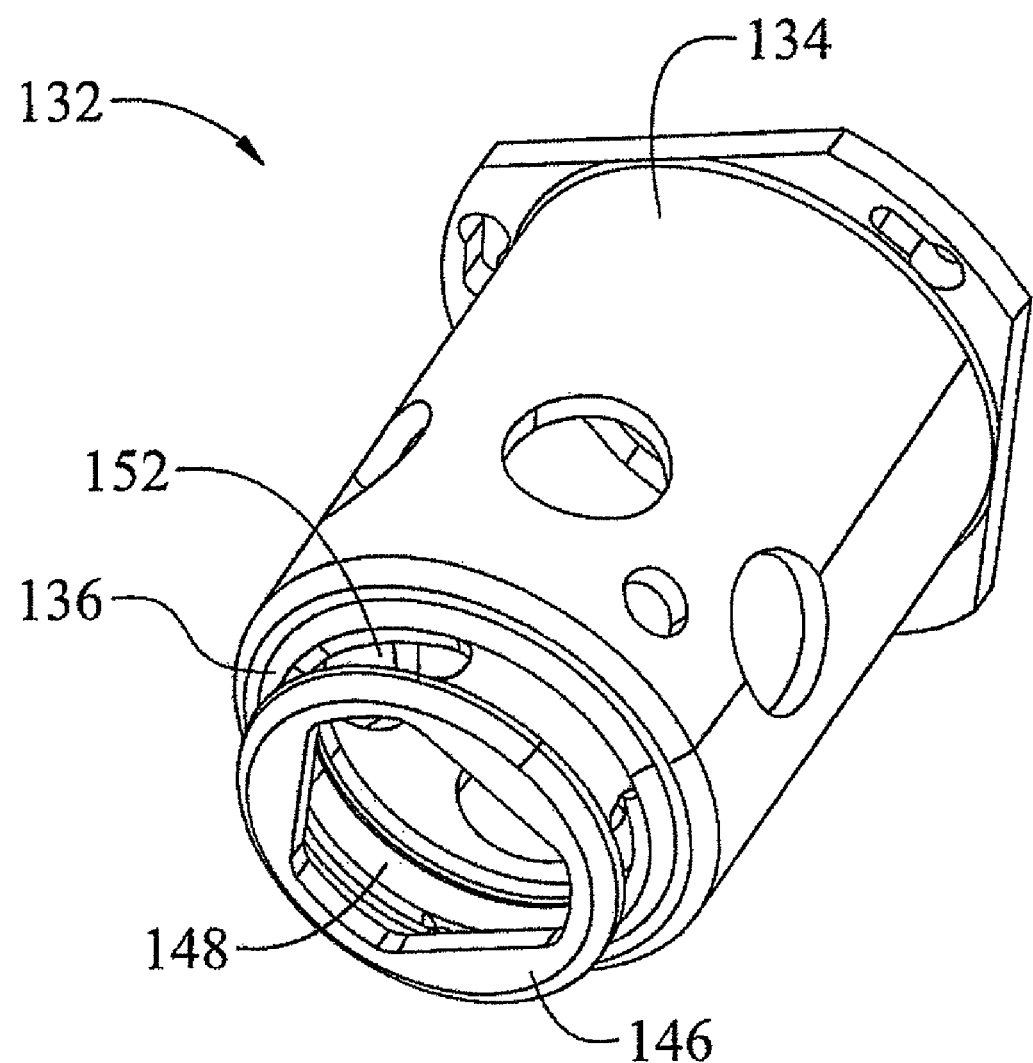
FIG. 5 is a perspective view of a distal end of a nosepiece housing in accordance with one implementation of the disclosure.

In the present configuration and as shown in FIGS. 4 and 5, the distal portion 136 of the nosepiece housing 132 is configured to mate with lobes 130 of the plate bushing 120. Specifically, an end 146 of the distal portion 136 has a hole 148 shaped to fit over the lobes 130 when a user positions the nosepiece relative to the plate bushing 120. As further described below, a user may cause the nosepiece housing 132 to be locked onto the lobes 130 through slots 152 and to be pressed against a distal surface 150 (shown in FIG. 7) provided by the lobes 130.

Figure 6:
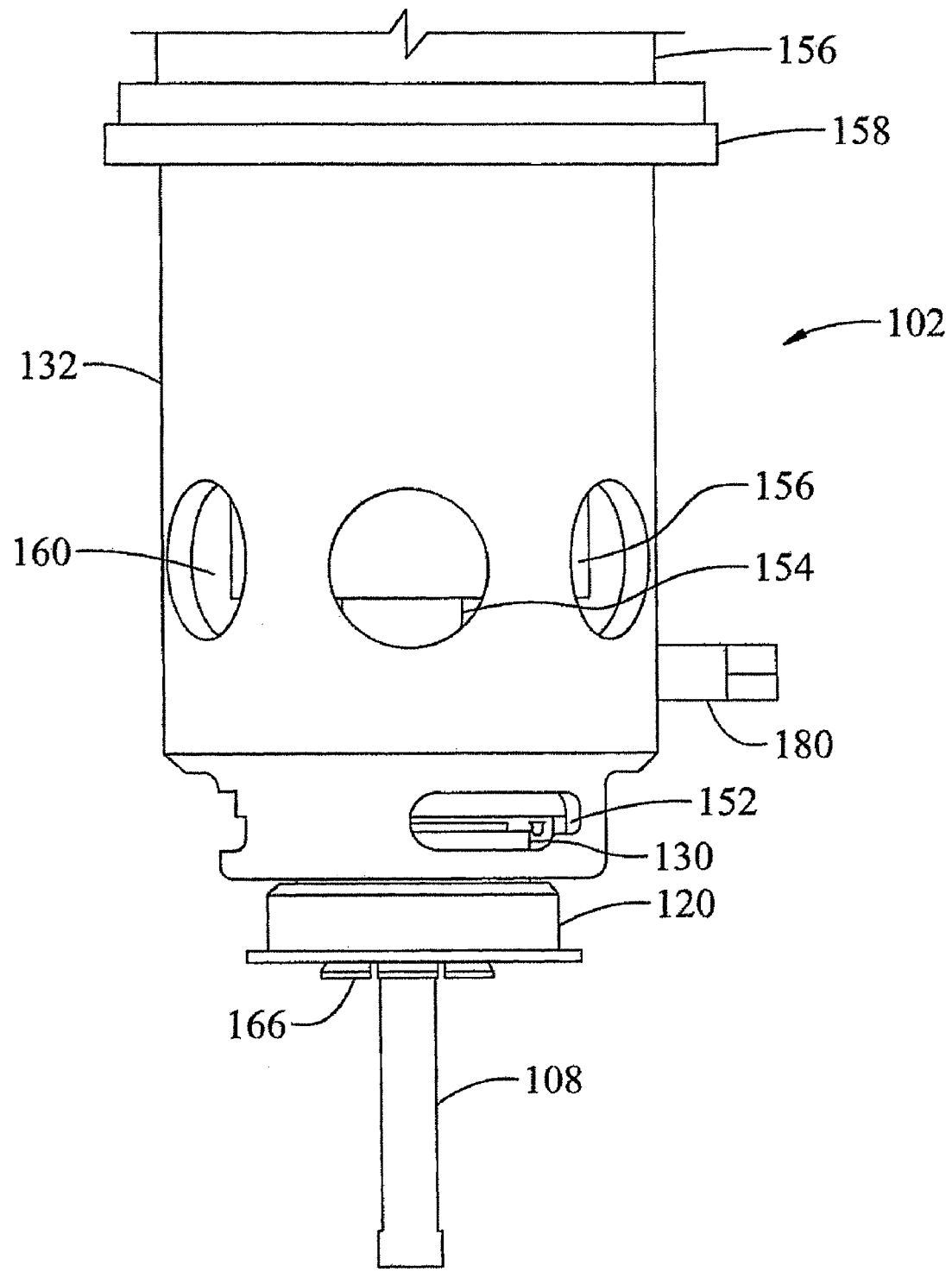
FIG. 6 is a side view of a nosepiece attached to a plate bushing in accordance with one implementation of the disclosure.

Referring now to FIGS. 3 and 6, the cutting tool 108 is held by a tool holder 154 configured for attachment to an orbital drill unit 156. The orbital drill unit 156 and attached cutting tool 108 may be rigidly connected with the nosepiece housing 132 at a plurality of housing flanges 158, two of which are shown in FIG. 6. In various configurations the tool holder 154 provides a standard interface, e.g., a HSK mount and heat shrink tool holder interface, between the tool 108 and the orbital drilling unit 156. In other configurations in which machining modules other than the present exemplary orbital drill unit are used, other or additional types of tool holder interfaces, e.g., CAT, SK, BT interfaces, may be used. The nosepiece housing 132 includes lateral holes 160 for chip evacuation via an external vacuum system and duct (not shown).

Figure 7:
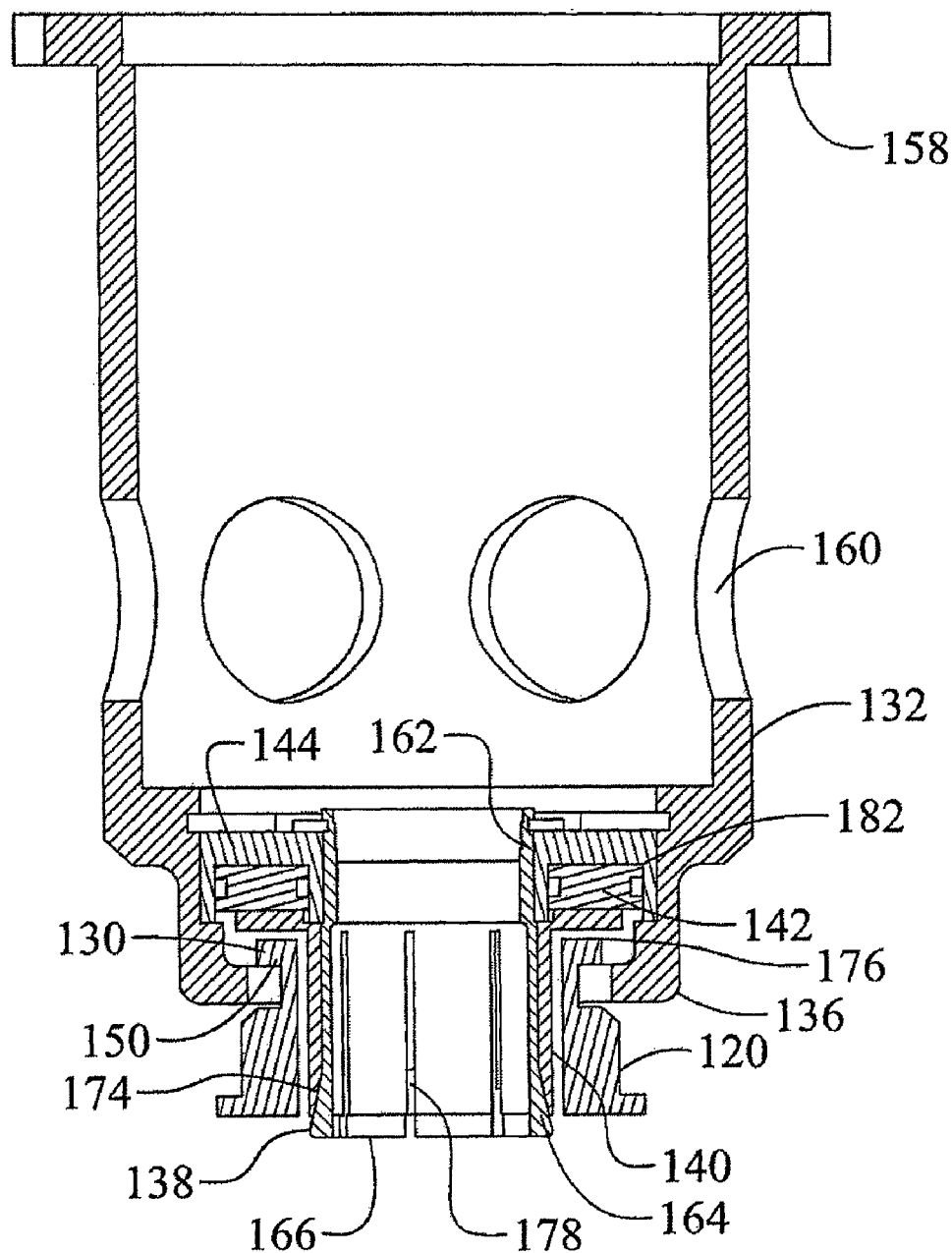
FIG. 7 is a longitudinal sectional view of a nosepiece and a plate bushing in accordance with one implementation of the disclosure, the nosepiece shown in an unclamped position.

A proximal portion 162 of the collet 138 is rigidly fixed to the nosepiece housing 132 through the piston cylinder 144. As shown in FIG. 7, a slotted distal portion 164 of the collet extending from the housing 132 includes a lip 166. The collet may be made of a single piece of material, e.g., of heat treatable stainless or tool steel. Slots 178 allow the machined diameter of the contacting surface of the lip 166 to contract as the collet clamp 140 slides over the distal portion 164 of the collet. The lip 166 is configured to fit over the protruding flange 50 of the bushing 32. In other implementations, a collet could be configured to fit over an element of a different type and/or having a different shape projecting from a work piece surface.

Figure 8:
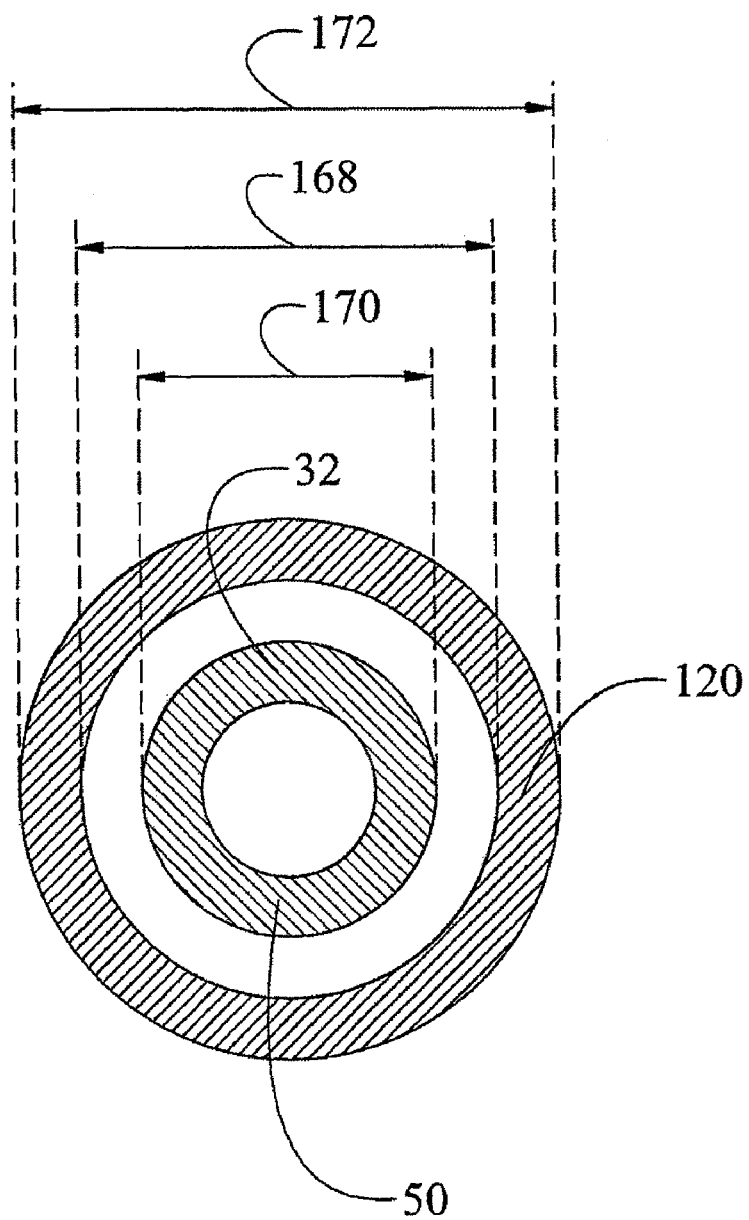
FIG. 8 is a top plan view of a plate bushing centered over a target bushing in accordance with one implementation of the disclosure.

The nosepiece 102 with integral collet 138 is configured for radial movement in the plate bushing 120 to allow centering of the collet 138 with fixed nosepiece 102 on the target bushing flange 50. Accordingly, dimensions of the plate bushing 120 are based on dimensions of the target bushing 32 and collet 138, e.g., as shown in FIG. 8. FIG. 8 is a top plan view of the plate bushing 120 centered over the target bushing 32. An inner diameter 168 of the plate bushing 120 may be established by adding twice the wall thickness of the collet 138 to an amount of leeway to a diameter 170 of the target bushing flange 50. For example, where a leeway of 0.050 inches is added to twice the collet wall thickness, the resulting plate bushing inner diameter 168 allows radial displacement of the collet 138 by 0.025 inches from a nominal drill location when the collet 138 is moved in the plate bushing 120 to center the nosepiece 102 on the target bushing flange 50. Thus, in the present configuration, leeway for radial movement of the collet 138 is a function of the difference in diameters 168 and 170 and the outside dimension of the collet clamp 140 divided by two.

An outer diameter 172 of the plate bushing 120 may be, e.g., a standard size used in drill plate fabrication. In the present exemplary configuration, the machine plate 100 and plate supports 116 are fabricated to provide a machine plate height that allows each plate bushing 120 to be at an appropriate height from the work piece surface 54 to ensure sufficient contact by the collet 138 over the target bushing flange 50.

The collet clamp 140 has a distal end 174 configured to be extended over the collet 138 to clamp the collet 138 onto the target bushing flange 50. The clamp 140 may be made from a highly elastic material, e.g., acetal copolymer. Such material allows the collet 138 to close around a target bushing flange within a predetermined vicinity of, e.g., plus or minus 0.010 inch diametric from, a nominal target bushing flange outside dimension and still substantially close a gap 176 (shown in FIG. 7) between the nosepiece housing, plate bushing 120 and collet clamp 140.

An air hose 180 (shown in FIG. 6) extending from an air pressure/vacuum system (not shown) into the housing 132 pneumatically connects the pressure/vacuum system with a space 182 defined in the piston cylinder 144. The piston 142 is rigidly attached to the clamp 140 and operable to push the clamp 140 at least partially through the housing 132 to clamp the collet 138 onto the target bushing flange 50 and the housing 132 onto the plate bushing 120. The housing 132 may be clamped onto the plate bushing 120 and against the lobe distal surface 150 to establish normality of the tool 108 relative to the target bushing flange 50.

A machine assembly that includes the foregoing aligning apparatus may be combined with an orbital drill unit and used in the following manner. A user installs the tool 108 in the tool holder 154 and installs the tool holder 154 in the orbital drill unit 156. The user then affixes the orbital drill unit to the proximal flanges 158 of the nosepiece housing 132 so that the tool 108 is extendable through the nosepiece 102. The machine plate 100 is positioned over the structure 20 so that one or more plate bushings 120 are positioned over one or more target drilling locations 28, e.g., over one or more target bushing flanges 50 projecting from the structure surface 54.

Placement of the machine plate may be in accordance with nominal drilling location specifications.

The user inserts the nosepiece 102 into a plate bushing 120 so that distal ends of the collet 138 and clamp 140 extend through the plate bushing 120 toward a target bushing flange 50. To position the collet lip 166 around the target bushing flange 50, the user may "float" the drill unit motor, keeping the tool distal end 104 retracted from the plate bushing 120, and may move the collet 138 longitudinally and/or sideward in the plate bushing until the collet 138 is centered on the bushing flange 50. To position the nosepiece 102 relative to the plate bushing 120, the user may rotate the nosepiece, e.g., up to about 60 degrees to mate the nosepiece hole 148 with the lobes 130 of the plate bushing 120. When the nosepiece and lobes have been mated, the piston 142 can be actuated toward the distal end of the housing 132 to lock the plate bushing lobes 130 into the distal end 146 of the nosepiece housing 132. It should be noted that unless the collet 138 is positioned over and onto the target bushing flange 50, the nosepiece 102 cannot be rotated and therefore cannot be locked onto the plate bushing lobes 130. In such manner, incorrect positioning of the collet onto the flange 50 can be avoided.

Figure 9:
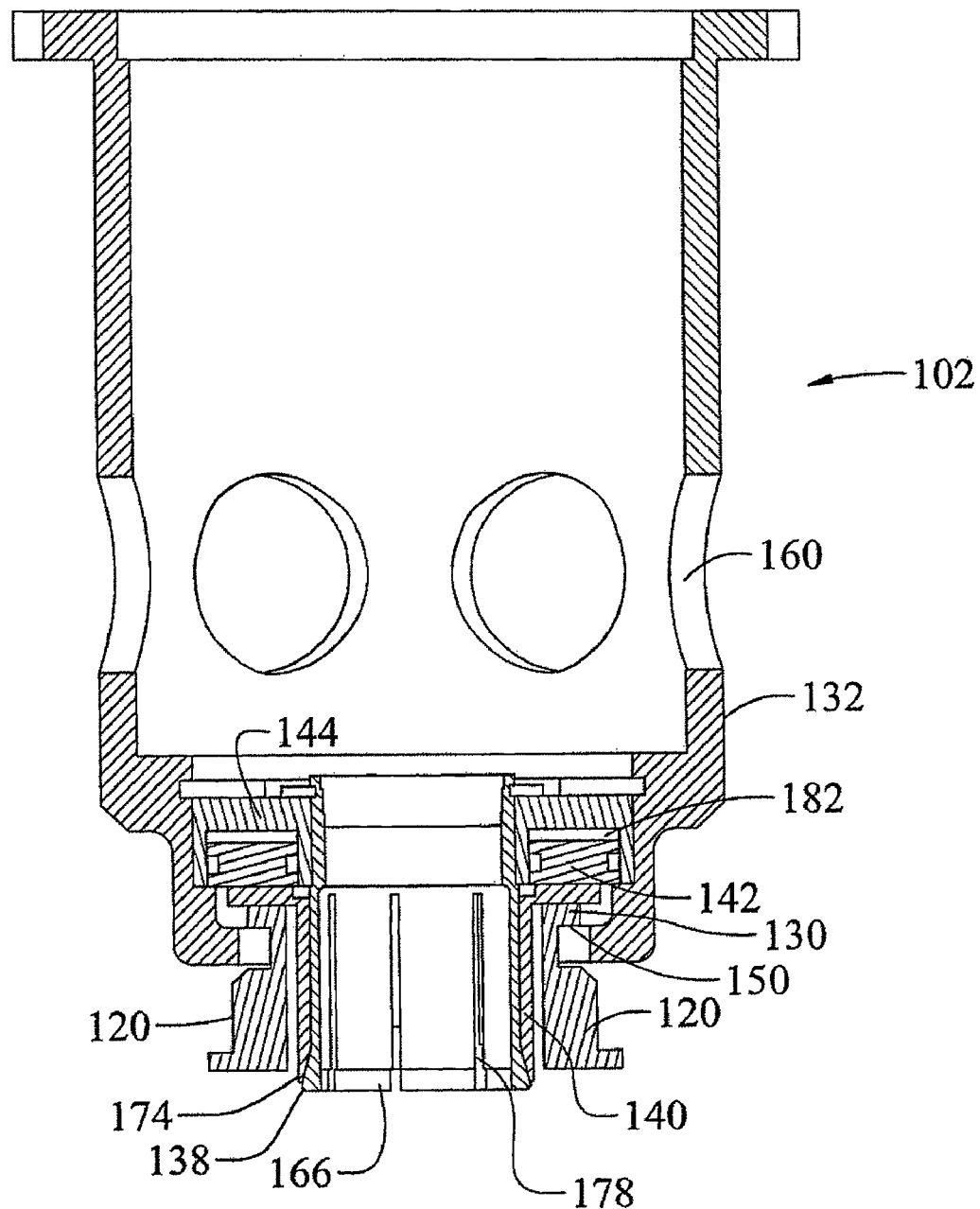
FIG. 9 is a side perspective view of a nosepiece in clamped position in accordance with one implementation of the disclosure.

When the nosepiece 102 has been rotated into position over the plate bushing lobes 130, the user may activate the clamp 140 by introducing gas or hydraulic pressure, e.g., air from the air pressure system through the air hose 180 into the piston cylinder 144. Air pressure may be supplied in the piston cylinder at between about 100 and 200 pounds per square inch. In some configurations, air pressure as high as about 400 pounds per square inch could be supplied in the cylinder 144. The pressure causes the piston 142 to push the clamp 140 distally in the piston cylinder 144. The clamp 140 closes the collet 138 around the flange 50 of the target bushing 32, centering the machine tool 108 and drill unit 156 over the target bushing 32. The clamp also clamps the nosepiece 102 against the plate bushing lobes 130. The nosepiece is forced against the lobe surface 150, thereby bringing the machine tool 108 and drill unit 156 into normality with the target bushing 32. This double clamping action, caused by a single stroke of the piston 142, restrains the nosepiece 102 and drill unit in the machine plate 100 in six degrees of freedom. The drill unit 156 can then be used to drill through the target bushing 32. The nosepiece 102 is shown in FIG. 9 in clamped position.

To remove the drill unit and nosepiece 102 from the machine plate 100, the user activates the air system to create a vacuum in the piston cylinder 144, thereby causing the piston 142 to withdraw the clamp 140 and allow the nosepiece 102 to be removed from the target bushing flange 50 and plate bushing lobes 130. It should be noted generally that the clamp 140 could be operated in other or additional ways. For example, manual operation of a collet clamp is contemplated in some implementations. It also should be noted that many different types of grasping mechanisms could be used in place of the rim 128 and lobes 130. For example, the rim and/or nosepiece distal end could include various contours instead of or in addition to flat surfaces.

Figure 13:
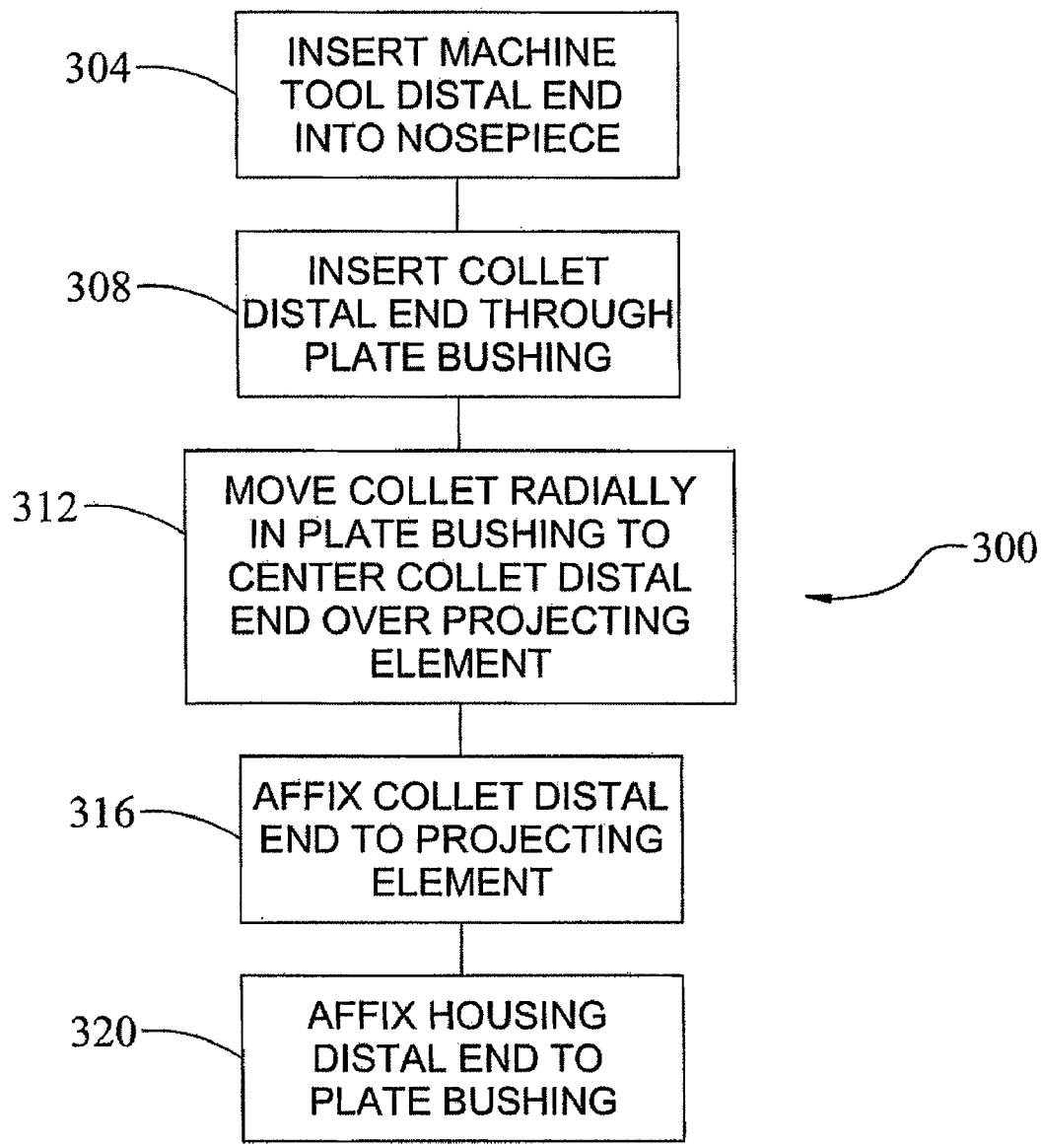
FIG. 13 is a flow diagram of a method of aligning a machine tool with a target location on a structure in accordance with one implementation of the disclosure.

A flow diagram of a method of aligning a machine tool with a target location on a structure in accordance with one implementation of the disclosure is indicated generally in FIG. 13 by reference number 300. In step 304 the distal end of the machine tool is inserted into a nosepiece for guiding a distal end of the tool. The nosepiece has a housing and a collet attached to and extending distally from the housing. In step 308, a distal end of the collet is inserted through a plate bushing in a machine plate positioned over an element projecting from the structure at the target location. In step 312 the collet is moved radially in the plate bushing to center the collet distal end over the element projecting from the structure. In step 316 the centered collet distal end is affixed to the projecting element. In step 320, a distal end of the housing is affixed to the plate bushing.

The foregoing apparatus and methods make it possible to use nominal specifications to position a drill plate over a work piece and then to perform drilling based on the location of a "landmark" on the underlying structure. Configurations of the machine plate and nosepiece interface make it possible to achieve both concentricity and normality in hole processing. It is possible for drilling to deviate from nominal locations while ensuring that a final hole is processed concentric with a required target location, e.g., an installed bushing. After a one-time installation of a drilling tool in the nosepiece, the drill unit and nosepiece can be inserted into a plurality of plate bushings to drill a plurality of hole locations without having to reinstall the tool in the nosepiece or perform other time consuming steps.

A single-acting cylinder provides the force sufficient to close the collet that finds the center of an installed work piece bushing and provides normality and rigidity for an orbital drill unit to process a hole. The center line of a hole is not determined by a drill bushing but rather by the location of an installed bushing or other projecting element on the structure. Using the foregoing apparatus and methods can increase productivity and lower production cycle times to produce high-quality holes.

The above aligning apparatus can be used in orbital drilling, the benefits of which can include the ability to obtain a plurality of hole diameters from a single cutter, low cutting forces, high surface-feet-per-minute machining of carbon fiber composite, stainless steel and/or titanium structure, minimal entry and/or exit burr and virtually no composite delamination. A simple interface with an orbital drill motor is provided, along with the ability to quickly locate the centerline of a fastener. The "insert, rotate, and lock" process to be followed by an operator is simple and quick to perform. The process is highly visible to an operator, and since there is a dedicated plate bushing size for each fastener diameter, errors can be reduced or eliminated.

While various embodiments have been described, those skilled in the art will recognize modifications or variations which might be made without departing from the present disclosure. The examples illustrate the various embodiments and are not intended to limit the present disclosure. Therefore, the description and claims should be interpreted liberally with only such limitation as is necessary in view of the pertinent prior art.

What is claimed is:

1. A machine plate apparatus for use with a machine tool in combination with a target location on a structure, the machine plate apparatus comprising:
    a target projection disposed on the structure in a defined relationship with respect to the target location;
    a plate body;
    at least one plate bushing disposed on the plate body, the plate bushing defining a hole positionable relative to the target projection on the structure;
    a nosepiece configured to transition between a connected position with the at least one plate bushing and a disconnected position with the at least one plate bushing,
    wherein the target projection is centered with respect to the at least one plate bushing when the nosepiece is configured in the connected position with the at least one plate bushing and the nosepiece engages the target projection;

the at least one plate bushing comprising a rim configured so as to engage the nosepiece in the connected position through which the machine tool is operable, the at least one plate bushing further configured to allow radial movement of the nosepiece such that the nosepiece transitions between the connected position and the unconnected position; and the at least one plate bushing further configured with respect to the plate body so as to establish a predefined angle of the machine tool relative to the target projection when the nosepiece is in the connected position.

2. The machine plate apparatus of claim 1, wherein the rim of the plate bushing comprises a plurality of lobes configured to mate with the nosepiece in the connected position.

3. The machine plate apparatus of claim 1, further comprising a plurality of supports configured to elevate the machine plate from a surface of the structure.

4. The machine plate apparatus of claim 1, wherein the machine plate comprises an aluminum machine plate.

5. The machine plate apparatus of claim 1, wherein the at least one plate bushing comprises at least one steel plate bushing.

6. A machine plate apparatus for use with a machine tool in combination with a target location on a structure, the structure further defining a landmark, the machine plate apparatus comprising:
 a target projection disposed on the structure;
 a nosepiece configured to grasp the target projection;
 a machine plate body having at least one plate bushing, each at least one plate bushing having a hole positionable relative to the target location on the structure, each at least one plate bushing further having a projecting portion configured to project from the structure at the target location, the projecting portion of the plate bushing graspable by the nosepiece through which the machine tool is operable;
 each at least one plate bushing further configured to establish a predefined angle of approach by the machine tool relative to the projecting portion when the nosepiece grasps the projecting portion of the plate bushing;
 wherein the target projection is centered with respect to the at least one plate bushing when the nosepiece grasps the target projection; and
 at least one plate bushing disposed on the landmark so as to position at least one plate bushing with respect to the target location on the structure.

7. The machine plate apparatus of claim 6, further comprising a rim on the projecting portion, wherein the rim on the projecting portion is graspable by the nosepiece through which the machine tool is operable.

8. The machine plate apparatus of claim 7, further comprising a plurality of lobes on the rim configured for mating with the nosepiece for locking the nosepiece to the at least one plate bushing.

9. The machine plate apparatus of claim 6, further comprising a plurality of supports configured to elevate the machine plate from a surface of the structure.

10. The machine plate apparatus of claim 6, wherein the at least one plate bushing comprises a plurality of plate bushings, each of the plurality of plate bushings having a hole positionable relative to a corresponding one of a plurality of target locations on the structure.

11. The machine plate apparatus of claim 6, wherein the machine plate comprises an aluminum machine plate.

12. The machine plate apparatus of claim 6, wherein the at least one plate bushing comprises at least one steel plate bushing.

13. The machine plate apparatus according to claim 1 wherein the structure further defines a landmark, and wherein the plate body is disposed on the landmark such that the hole of the at least one plate bushing is positioned over the target location.

14. The machine plate apparatus according to claim 1 wherein a plate bushing of the plate body is positioned on the landmark.

15. The machine plate apparatus according to claim 1 wherein the plate body defines an upper plate surface, and wherein the connected position of the nosepiece with the plate bushing sets the tool at a normal configuration relative to the upper plate surface.

16. The machine plate apparatus according to claim 1 wherein the connected position of the nosepiece with the plate bushing sets the tool at a centered configuration relative to the plate bushing.

17. The machine plate apparatus according to claim 1 wherein the target projection comprises a target bushing.

18. The machine plate apparatus according to claim 1 further comprising a plurality of plate bushings disposed on the plate body, the plurality of plate bushings defining a plurality of holes, and wherein a first plate bushing is disposed on the target projection such that the hole of a second plate bushing is positioned over the target location.

19. The machine plate apparatus according to claim 1 further comprising a collet disposed within the nosepiece, a distal portion of the collet defining a plurality of slots so as to enable inward and outward radial movement of the collet, the collet configured so as to move radially inwardly thereby grasping the target projection when the nosepiece is in the connected position so as to center the target projection within the plate bushing.

20. The machine plate apparatus of claim 1, wherein the at least one plate bushing comprises a plurality of plate bushings, each of the plurality of plate bushings having a hole positionable relative to a corresponding one of a plurality of target locations on the structure.

* * * * *